April 19, 1938.  F. J. T. BARNES  2,114,366
PIPE COUPLING
Filed Feb. 15, 1935   3 Sheets-Sheet 1

INVENTOR.
F. J. T. Barnes.
By Stone, Boyden & Mack
ATTORNEYS.

INVENTOR.
F. J. T. Barnes.
By Stone, Boyden & Mack
ATTORNEYS.

April 19, 1938.  F. J. T. BARNES  2,114,366

PIPE COUPLING

Filed Feb. 15, 1935  3 Sheets-Sheet 3

INVENTOR.
F. J. T. Barnes.
By Stone, Boyden & Mack
ATTORNEYS.

Patented Apr. 19, 1938

2,114,366

UNITED STATES PATENT OFFICE 2,114,366

PIPE COUPLINGS

Frederick John Trevallon Barnes, Brisbane, Australia

Application February 15, 1935, Serial No. 6,751
In Great Britain February 20, 1934

10 Claims. (Cl. 285—126)

This invention is for improvements in or relating to pipe-couplings, and has for its object to provide a pipe-coupling in which the ingress of foreign matter into the various parts of the coupling is prevented. The invention is thus particularly applicable to pipe-lines employed in breweries for the conveyance of beer and like beverages in that it overcomes the disadvantages of known couplings in which wild yeast accumulates between the various parts of the coupling which ferments and contaminates the beer flowing through the pipe.

According to one feature of the invention, a pipe-coupling comprises, in combination, a sleeve of resilient material engaging the end of one or both pipes and having an inwardly-directed flange which lies between the adjacent ends of the pipes, and a clamp surrounding the ends of the pipes so as to retain the resilient sleeve in position. The radial dimension of the flange on the resilient sleeve is preferably equal to the thickness of the wall of the pipe so as to lie flush with the bore thereof. The resilient flange, which may be of rubber or other suitable material, thus effectively seals the circumferential gap between the ends of the two pipes so that it is impossible for any substance to pass from the interior of the pipe into the coupling.

According to another feature of the invention, means are provided for compressing the resilient sleeve longitudinally of the pipes. Alternatively, or in addition, means may be provided for compressing the sleeve radially on to the pipe.

In a preferred construction, two separate resilient flanged sleeves are provided, one on the end of each pipe and clamping means are provided for forcing the pipes together longitudinally and for compressing the sleeves on to the ends of the pipes. The coupling may conveniently be applied to glass tubing or to a joint between a glass and a metal tube.

Another feature of the invention consists in the means, hereinafter described, for supporting a glass tube.

Specific embodiments of the invention will now be described by way of example with reference to the accompanying drawings, of which:—

Figure 4:
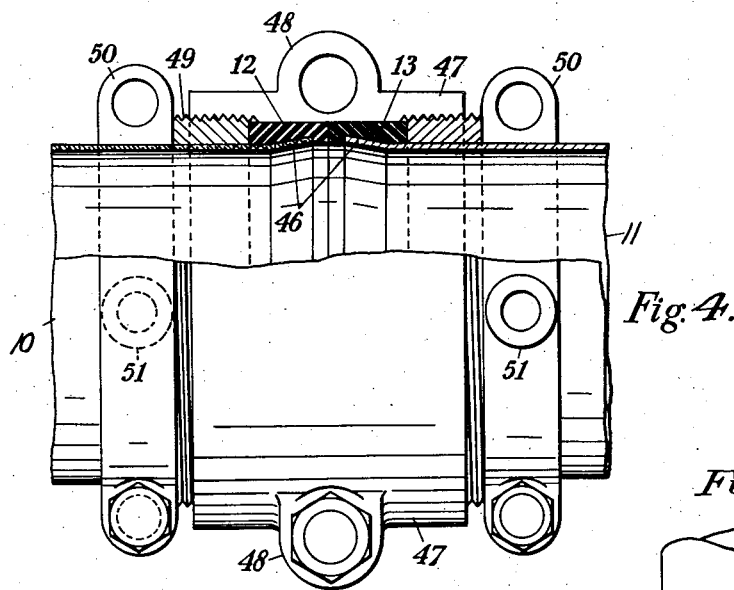
Figure 5:
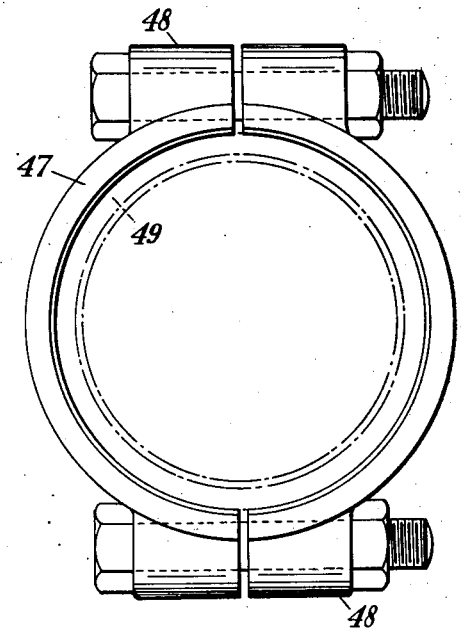
Figure 1:
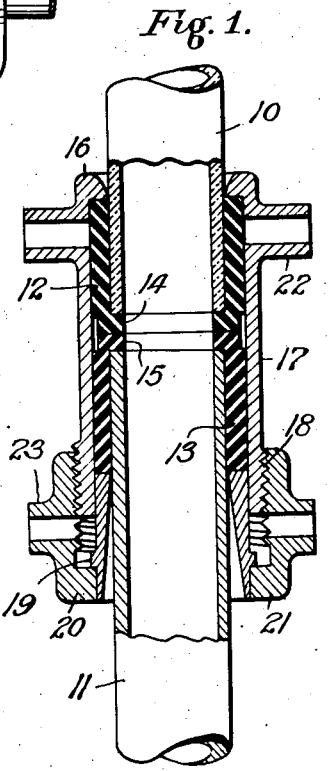
Figure 2:
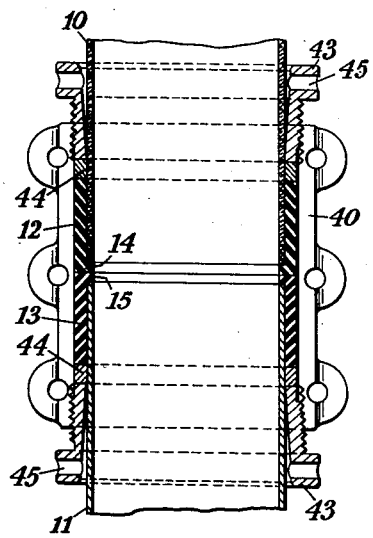
Figure 3:
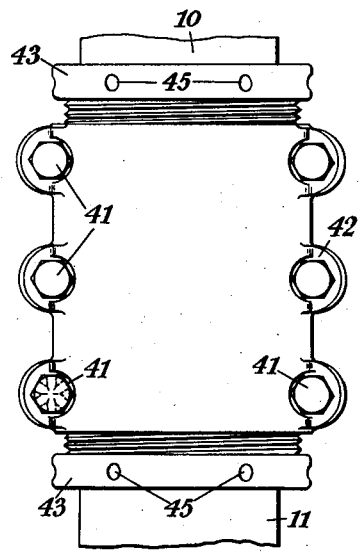
Figure 7:
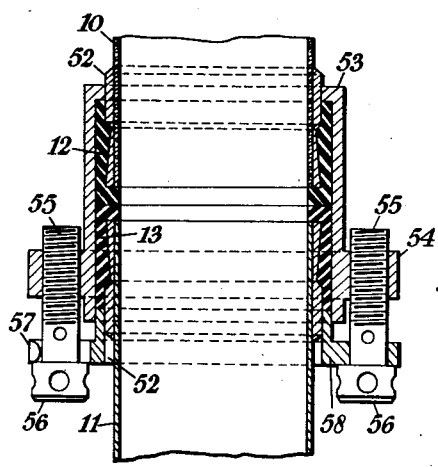
Figure 8:
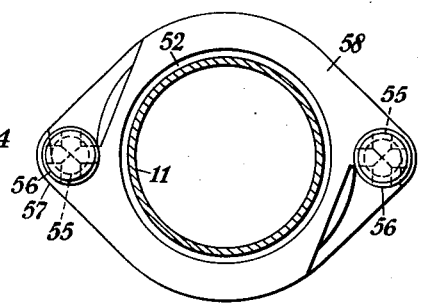
Figure 6:
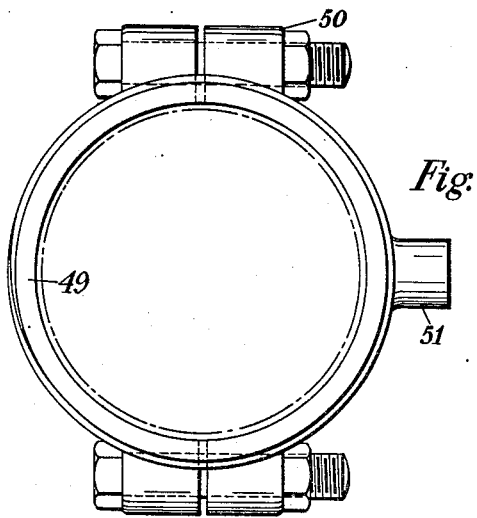
Figure 9:
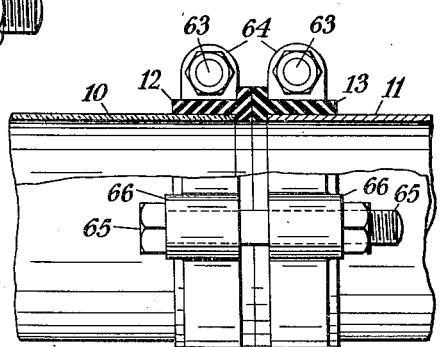
Figure 10:
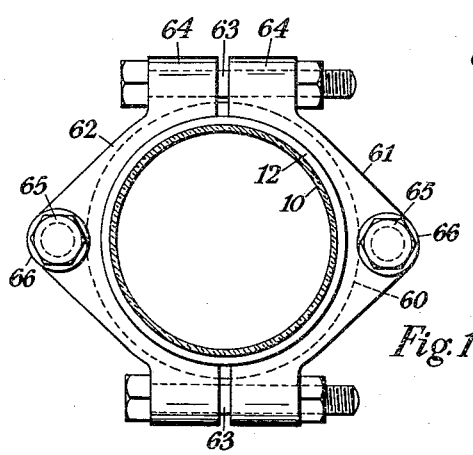

Figure 1 shows a form of pipe-coupling, in section, suitable for use in dispensing beer, Figures 2 and 3 are a sectional elevation and an outside elevation, respectively, of a pipe-coupling suitable for large beer lines in a brewery, Figures 4 and 5 are a sectional elevation and an end elevation, respectively, of a modified form of large coupling, Figure 6 being a view of one of the clamps separately, Figures 7 and 8 are a sectional elevation and an end elevation of yet another form of coupling, and Figures 9 and 10 are an elevation (partly in section) and an end elevation of yet another form of coupling according to the invention.

As shown first in Figure 1, a glass tube 10 is engaged at its end by a rubber sleeve 12 having an inwardly-directed integrally-formed flange 14. A metal tube 11 is similarly furnished with a rubber sleeve 13 having an inwardly-directed flange 15. It will be seen that the flanges 14 and 15 extend inwardly by such a distance as to lie flush with the inner walls of the tubes 10 and 11.

The rear edge of the rubber sleeve 12 is engaged by an annular shoulder 16 formed on a sleeve-shaped nut-member 17 which passes along the two rubber sleeves 12 and 13, completely surrounding them. The rear end of the rubber sleeve 13 is engaged by a gland-member 18 having a flange 19 which co-operates with an inward flange 20 formed integrally with another nut-member 21 having screw-threaded engagement with the nut 17. The nuts 17 and 21 thus constitute a clamp and may be provided with lugs 22, 23 for engagement by a suitable tool.

The coupling illustrated in Figure 1 is assembled as follows. The nut 21, and then the gland-member 18, are passed onto the metal tube 11 and the nut 17 is passed on to the tube 10. The rubber sleeves 12 and 13 are then fitted to the ends of the tubes 10 and 11, respectively. The nut-members are brought together and rotated, whereby the two rubber sleeves are subjected to compression longitudinally of the pipes so that they grip the outside walls of the pipes tightly and make a fluid-tight joint. During rotation of the nut 21 the gland-member 18 remains stationary in a rotational sense so that there is no relative rotation between the rubber sleeve 13 and any other part with which it makes contact. Similarly, the flanges 14 and 15 are subjected to compression between the ends of the pipes and form a seal such that matter is prevented from passing into the coupling between either of the tubes and its flange, or between the two flanges.

It will be seen that the coupling shown in Figure 1 may be dismantled by a reversal of the operations described above and that when the nuts have been separated and passed along the tubes the tubes may be separated for cleaning by relative lateral movement; no longitudinal withdrawal is required.

In the form of the invention shown in Figures 2 and 3 two metal pipes 10 and 11 are provided each with a rubber sleeve 12, 13 having inwardly-directed flanges 14 and 15 as already described with reference to Figure 1. The rubber sleeves are surrounded by an aluminium sleeve composed of two portions 40 affixed together by bolts 41 passing through holes in lugs 42. The sleeve is internally screw-threaded at each end to receive nut-members 43 which engage metal thrust-rings 44 bearing against the rear ends of the rubber sleeves 12 and 13.

With this form of coupling the joint may be broken by the nuts 43 being unscrewed by means of a spanner engaging holes 45; the complete sleeve 40 may then be slid along one of the pipes, leaving the rubber sleeves 12 and 13 exposed. The pipes may then be moved laterally for cleaning. When the joint is re-assembled the nuts 43 are screwed in so as to press the rings 44 tightly on to the rubber whereby the ends of the pipes are tightly gripped and the space between their adjacent ends sealed as has already been described with reference to Figure 1. The purpose of the thrust-rings 44 is to avoid relative rotation between the ends of the rubber sleeves and adjacent metal parts.

In the alternative form of coupling shown in Figures 4 and 5 the ends of the pipes 10 and 11 are slightly flared outwardly as shown at 46 and the rubber sleeves 12 and 13 are shaped so as to conform to the outer surface of the pipes, inwardly-extending flanges 14 and 15 being provided as before. In this construction the rubber sleeves are surrounded by an aluminium sleeve 47 which is in two parts held together by bolts (not shown) passing through lugs 48. The ends of the sleeve 47 are engaged by screw-threaded clamp-members 49 one of which is shown in Figure 6. Each clamp-member is composed of two portions held together by bolts passing through lugs 50 and a further lug 51 is formed on one or both bolts for engagement by a tool to rotate the clamp.

In the construction shown in Figures 4, 5 and 6, the two halves of each clamp-member 49 may be tightened up after the clamp has been screwed into the sleeve 47 so that the clamp grips the pipe tightly and provides an abutment against longitudinal relative movement between the pipes.

In the modified construction of Figures 7 and 8, the two metal pipes 10 and 11 have attached to their ends ferrules 52 and 53 having serrated outer surfaces. Rubber sleeves 12 and 13 fit over the ferrules, being similarly shaped. The rubber sleeve 12 is engaged by the inwardly-directed flange formed on a sleeve-like member 53 having lugs 54 for engagement by bolts 55. These bolts have heads 56 which engage projections 57 on a smaller sleeve 58, the inner end of which engages the outer end of the rubber sleeve 13 so that when the bolts 56 are tightened up the rubber sleeves are compressed as has already been described.

This form of joint may be disassembled as follows. The bolts 56 are slackened off and the sleeve 58 is rotated left-handedly as seen in Figure 8 so that the projections 47 come out of register from the bolts. The two sleeves 53 and 58 may then be drawn apart along the pipes which may be separated by lateral movement as has already been explained.

In the coupling shown in Figures 9 and 10, each pipe 10 and 11 is fitted with a rubber sleeve 12, 13, the sleeve in each case having an outwardly-extending flange 60 in addition to the inwardly-extending flanges 14 and 15. Each rubber sleeve is surrounded by a clamp (see Figure 10) which comprises two sleeves 61 and 62 held together by bolts 63 passing through lugs 64. The two complete clamps are held together by bolts 65 engaging lugs 66.

With this form of coupling it is only necessary to remove the bolts 65 to break the joint. The pipes can then be relatively moved laterally.

It will be appreciated that the ends of the pipes may be shaped in any desired manner to engage the rubber sleeves which are correspondingly shaped. For example, the glass pipe of Figure 1 may be formed with a bead at the end to engage a corresponding recess in the surrounding rubber sleeve; alternatively, the end of the pipe may be coned outwardly as shown at 46 in Figure 4.

Where the invention is applied to fairly small couplings, such as that shown in Figure 1, the parts need not be made of metal; for example, the nuts 17 and 21 of Figure 1 could be made from a synthetic resin such as that sold under the registered trade-mark "Bakelite".

It will be seen that the pipe-couplings described above effectively prevent the ingress of any substance from the interior of the pipe into the parts of the joint. Another advantage of the invention is that a pipe-line constructed with joints as described above is more or less flexible.

I claim:

1. A device for coupling together a pair of pipes for conveying beer or other beverages, of which at least one pipe is made of glass, comprising a cylindrical sleeve of resilient material upon the end of each pipe, each of said sleeves having an inturned flange equal in radial extent to the thickness of the respective pipe, said flanges butting together, at least one constraining sleeve surrounding and contacting with said resilient sleeves and means for forcing said resilient sleeves together in the longitudinal direction to make a tight seal between their abutting flanges.

2. A device for coupling in end to end relation a pair of pipes for conveying beer or other beverages, of which at least one pipe is made of glass, comprising in combination a cylindrical sleeve of resilient material upon the end of each pipe, each of said sleeves having an inturned flange, equal in radial extent to the thickness of the respective pipe, said flanges butting together, a rigid sleeve surrounding and contacting with both said resilient sleeves and at least one member adapted to enter said rigid sleeve and apply end pressure to said resilient sleeves to compress them in the longitudinal direction.

3. A device for coupling in end to end relation a pair of pipes for conveying beer or other beverages, of which at least one pipe is made of glass, comprising in combination a cylindrical sleeve of resilient material upon the end of each pipe, each of said sleeves having an inturned flange equal in radial extent to the thickness of the respective pipe, said flanges butting together, a rigid sleeve surrounding and contacting with both said resilient sleeves, a spacing ring lying within said rigid sleeve adjacent the outer end of one of said resilient sleeves and a compressing member adapted to enter said rigid sleeve to engage said spacing ring and impart a longitudinal end thrust to said resilient sleeves through said spacing ring to compress said sleeves longitudinally.

4. A device for coupling in end to end relation a pair of pipes for conveying beer or other beverages, of which at least one pipe is made of glass, comprising in combination a cylindrical sleeve of resilient material upon the end of each pipe, each of said sleeves having an inturned flange equal in radial extent to the thickness of the respective pipe, said flange butting together, a rigid sleeve surrounding and contacting with both said resilient sleeves, an inturned flange on one end of said rigid sleeve engaging over the outer end of one of said resilient sleeves, a spacing ring adapted to enter said rigid sleeve from the other end thereof, and a nut engaging the end of said rigid sleeve adapted to press said spacing ring into said rigid sleeve to compress said resilient sleeves longitudinally between said ring and said inturned flange at the remote end of said rigid sleeve.

5. A device for coupling in end to end relation a pair of pipes for conveying beer or other beverages, of which at least one pipe is made of glass, comprising in combination a cylindrical sleeve of resilient material upon the end of each pipe, each of said sleeves having an inturned flange equal in radial extent to the thickness of the respective pipe, said flanges butting together, a rigid sleeve surrounding and contacting with both said resilient sleeves, spacing rings within said rigid sleeve lying against the outer ends of said resilient sleeves and nut members adapted to engage opposite ends of said rigid sleeve and impart opposed longitudinal thrusts to compress said resilient sleeves through the respective spacing rings.

6. A device for coupling in end to end relation a pair of pipes for conveying beer or other beverages, of which at least one pipe is made of glass, comprising a cylindrical sleeve of resilient material upon the end of each pipe, each of said sleeves having an inturned flange equal in radial extent to the thickness of the respective pipe, said flanges butting together, an external sleeve surrounding and contacting with both said resilient sleeves, means for tightening said external sleeve upon said resilient sleeves to apply a radial compression thereto and nut members screwed into the ends of said external sleeve to impart a longitudinal thrust to compress said resilient sleeves.

7. A device for coupling in end to end relation a pair of pipes for conveying beer or other beverages, of which at least one pipe is made of glass, comprising a cylindrical sleeve of resilient material upon the end of each pipe, both of said sleeves having inturned flanges equal in radial extent to the thickness of the respective pipe, said flanges butting together, a divided external sleeve surrounding and contacting with each of said resilient sleeves, means for tightening said external sleeves radially upon their respective resilient sleeves and means for drawing together said external sleeves longitudinally, to force said butting flanges axially together.

8. A device for coupling in end to end relation a pair of pipes for conveying beer or other beverages, of which at least one pipe is made of glass, comprising a cylindrical sleeve of resilient material upon the end of each pipe, the ends of said sleeves butting together, means for retaining said sleeves upon the respective pipe ends when said coupling is disconnected, means for restraining radial enlargement of said resilient sleeves and means for applying pressure to the ends of said resilient sleeves to compress them in the longitudinal direction.

9. A device for coupling in end to end relation a pair of pipes for conveying beer or other beverages, of which at least one pipe is made of glass, comprising an enlargement at the end of each pipe, a cylindrical resilient sleeve upon the end of each pipe and enclosing said enlargement, an inturned flange on each of said sleeves lying against the end face of the respective pipe, the radially innermost edge of which lies flush with the bore of the pipe, said flanges butting together, means for restraining radial expansion of said resilient sleeves and means for applying pressure to the ends of said resilient sleeves to compress them longitudinally.

10. A device for coupling in end to end relation a pair of pipes for conveying beer or other beverages, of which at least one pipe is made of glass, wherein the ends of the pipes to be coupled are flared and comprising a cylindrical resilient sleeve upon each of said flared ends, said sleeves each having an inturned flange of radial extent equal to the thickness of the respective pipe wall, said flanges butting together, a split sleeve surrounding both of said resilient sleeves, means for tightening said split sleeve upon said resilient sleeves to compress same radially and nut members adapted to enter said split sleeve and apply a longitudinal compressing thrust to said resilient sleeves.

FREDERICK JOHN TREVALLON BARNES.